United States Patent [19]

Bauer et al.

[11] Patent Number: 5,182,054
[45] Date of Patent: Jan. 26, 1993

[54] PROCESS FOR GRANULATING PERBORATE MONOHYDRATE

[75] Inventors: Volker Bauer; Wilfried Raehse, both of Duesseldorf; Klaus Koester; Jochen Jacobs, both of Wuppertal, all of Fed. Rep. of Germany

[73] Assignee: Henkel Kommanditgesellschaft auf Aktien, Duesseldorf, Fed. Rep. of Germany

[21] Appl. No.: 834,302

[22] PCT Filed: Aug. 10, 1990

[86] PCT No.: PCT/EP90/01320
§ 371 Date: Feb. 19, 1992
§ 102(e) Date: Feb. 19, 1992

[87] PCT Pub. No.: WO91/02696
PCT Pub. Date: Mar. 7, 1991

[30] Foreign Application Priority Data

Aug. 19, 1989 [DE] Fed. Rep. of Germany ....... 3927398
Nov. 9, 1989 [DE] Fed. Rep. of Germany ....... 3937251

[51] Int. Cl.$^5$ .................................................. B29B 9/00
[52] U.S. Cl. ....................................... 264/15; 252/99; 252/186.31; 264/118; 264/122
[58] Field of Search .................... 264/15, 118, 122; 252/186.3, 186.31, 99

[56] References Cited

U.S. PATENT DOCUMENTS 2,979,464  4/1961  Pistor .................................. 252/99
4,405,486  9/1983  Eoga .............................. 252/186.31
4,695,397  9/1987  Sommer et al. ..................... 252/182
4,894,211  1/1990  Condó et al. ....................... 423/266
4,925,382  5/1990  Bergendahl et al. ............... 425/367

FOREIGN PATENT DOCUMENTS 551495  5/1986  Australia .

OTHER PUBLICATIONS

Abstract of JP 60-112714.

Primary Examiner—Mary Lynn Theisen
Attorney, Agent, or Firm—Ernest J. Szoke; Wayne C. Jaeschke; Real J. Grandmaison

[57] ABSTRACT

The process of preparing granules of sodium perborate monohydrate having an increased density by dry-compacting a mixture of sodium perborate monohydrate and from about 0.2 to about 30% by weight of a compacting aid, based on the weight of the mixture. The compacting aid is selected from the group consisting of an alkali metal salt, alkaline earth metal salt, carbohydrate, anionic surfactant, and nonionic surfactant. After forming a compactate of the mixture, the compactate is size-reduced to obtain granules having the desired particle size.

17 Claims, No Drawings

PROCESS FOR GRANULATING PERBORATE MONOHYDRATE

BACKGROUND OF THE INVENTION

1. Field of the Invention

This invention relates to the production of inorganic peroxo compounds.

Inorganic peroxo compounds, particularly perborates, have long been used as oxidizing agents in bleaches, detergents and disinfectants. Whereas perborate tetrahydrate has hitherto mainly been used in detergents and bleaches, the monohydrate has also recently been acquiring increasing significance by virtue of its higher active oxygen content and its higher dissolving rate. According to present knowledge, these compounds are in reality the hexahydrate or rather the anhydrous form of cyclic sodium diperoxodiborate although the old names, perborate tetrahydrate ($NaBO_3.4\ H_2O$) and sodium perborate monohydrate ($NaBO_3.H_2O$), are used in the following. The standard characterization based on the active oxygen content, according to which products containing more than 15% AO are termed monohydrate, is also retained in the following (theoretical active oxygen content of the monohydrate: 16.0% by weight).

2. Discussion of Related Art

In its production on an industrial scale from sodium borate and hydrogen peroxide, perborate tetrahydrate is generally obtained in the form of a coarsely crystalline, abrasion-resistant powder of relatively high apparent density. Accordingly, it can readily be incorporated in standard detergents. By contrast, perborate monohydrate, which is normally produced by drying from the perborate tetrahydrate, is a light porous material with little abrasion resistance which is difficult to incorporate in this form. Accordingly, there has been no shortage of attempts to eliminate these disadvantages of the monohydrate. One possibility in this regard is to granulate the perborate monohydrate. Thus, it is proposed in DE 26 50 225 to combine hydrogen peroxide and borate with simultaneous drying in a fluidized bed to form perborate monohydrate which accumulates in granular form providing the process is suitably managed. However, reliable adjustment of the process parameters is difficult. In other known processes, the tetrahydrate is first agglomerated with water and/or other granulation aids to form relatively large particles which are then dewatered in a following drying step to form perborate monohydrate granules (EP 202 519, Ep 295 950, EP 296 813 and earlier application DE-p 38 30 545.3 . One feature common to all these processes is that the granulated monohydrate is also obtained in a relatively light form, i.e. with a low apparent density. Accordingly, these forms of the monohydrate can only be used to a limited extent in modern detergents, which have very high apparent densities, because separation can occur. In addition, it is proposed in EP 102 419 to granulate perborates, particularly the oxoborate obtainable by heating of the monohydrate, by compaction. However, this process requires the addition of polytetrafluoroethylene as lubricant and gives a product unsuitable for detergents and bleaches, not the least because this additive is non-biodegradable.

Accordingly, the problem addressed by the present invention was to provide perborate monohydrate in a form suitable for use in modern detergents.

DESCRIPTION OF THE INVENTION

Other than in the operating examples, or where otherwise indicated, all numbers expressing quantities of ingredients or reaction conditions used herein are to be understood as modified in all instances by the term "about".

According to the invention, this problem has been solved by a process in which perborate monohydrate is dry-compacted with addition of compacting aids selected from the group consisting of alkali metal salts, alkaline earth metal salts, carbohydrates, which may optionally be etherified, anionic surfactants and nonionic surfactants and is then size-reduced to the required degree. Compacting is preferably carried out between rollers.

Whereas perborate monohydrate can only be compacted to a limited extent in the absence of additives, the process according to the invention provides a product of high density which, nevertheless, surprisingly has a sufficiently high dissolving rate comparable in many cases with that of the untreated monohydrate. At the same time, the granules obtained are highly resistant to abrasion. Accordingly, they may be used with advantage in granular detergents or cleaning preparations.

More particularly, the process according to the invention is carried out as follows:

Perborate monohydrate and the compacting aid are separately measured off by means of suitable apparatus, the compacting aid is then added to the perborate monohydrate and, if necessary, is thoroughly mixed with the perborate monohydrate. The perborate monohydrate may be used in its commercial fine porous form. The compacting aid is also preferably used in fine-particle or even finer form. Suitable mixers are, for example, paddle mixers, such as Lödige and Drais mixers, or intensive mixers, such as Eirich and MTI mixers. The mixture of both substances is then fed to the compacting unit, optionally after temporary storage. In principle, tabletting presses, extrusion presses, pelletizers and similar machines are suitable for compacting. However, compacting is preferably carried out between rotating rollers. On the one hand, this is particularly easy to carry out on a large scale and, on the other hand, enables the advantages of the process according to the invention to be seen particularly clearly. In another preferred embodiment, compacting is carried out between smooth rollers although surface-textured rollers may also be used.

Compacting is preferably carried out under linear pressures of about $1.7.10^3$ to about $5.10^4$ N/cm. The rollers are normally heated by throughflowing liquids, operating temperatures of about 20° to about 60° C. being preferred. After leaving the compacting unit, the compactates are, if necessary, size-reduced to the required degree by means of suitable apparatus, such as cutters or mills. Particle sizes of from about 0.3 to about 2 mm are favorable for use in detergents, although other particle sizes may readily be produced by the process according to the invention. The size-reducing step may be followed by rounding of the particles formed in suitable apparatus, for example a Marumerizer or a ball mill. Irrespective of this, the unwanted fine and coarse components are if necessary removed, generally by sieving, leaving an optimal particle size distribution for the desired application. The components removed may be returned to the production process. The process according to the invention may of course be carried out both discontinuously and semi-continuously or fully continuously.

The alkali metal or alkaline earth metal salts used as additives may be soluble or even insoluble salts. For the production of quick-dissolving granules, it is best to use readily soluble alkali metal or alkaline earth metal salts. Both anhydrous salts and also dry hydrates are suitable. Hygroscopic salts are unsuitable in the majority of cases because they can lead to sticking of the granules in a moist atmosphere. In addition, it is important when selecting the salts to ensure that the anions are compatible with perborate monohydrate. Accordingly, salts containing readily oxidizable anions are as unsuitable as salts showing a highly acidic reaction. Examples of suitable soluble inorganic salts are sodium carbonate and its hydrates, sodium sulfates and its hydrates, sodium bicarbonate, sodium sesquicarbonate, potassium carbonate, potassium sulfate, magnesium sulfate and its hydrates and sodium silicate. Examples of suitable insoluble inorganic salts are magnesium silicate and sodium aluminium silicate (for example zeolite NaA). Examples of suitable organic salts are sodium acetate, magnesium acetate, sodium citrate, magnesium citrate and magnesium lactate. Of these salts, sodium perborate tetrahydrate, sodium sulfate, sodium citrate, sodium lactate and sodium aluminium silicate are preferred, sodium carbonate and sodium carbonate decahydrate being particularly preferred.

Carbohydrates are also suitable compacting aids for the process. The carbohydrates may be mono-, oligo- or polysaccharides which may even be modified by etherification, preferably with short-chain alcohols (1 to 3 carbon atoms). Examples of such carbohydrates are glucose, sucrose, starch and carboxymethyl cellulose. Polysaccharides, optionally in modified form, are preferably used.

Anionic and nonionic surfactants are also suitable compacting aids. Examples of such surfactants are alkyl benzenesulfonates, alkyl sulfates and alkyl ether sulfates and also long-chain alkyl glycosides and addition products of ethylene oxide with long-chain alcohols or alkylphenols. In their case, as with all other organic compacting aids, the type and quantity of compacting aid has to be selected in such a way that the mixtures formed are neither readily inflammable nor sensitive to impact.

The quantity of compacting aid may be freely selected within wide limits, an upper limit being imposed solely by the possibly undesirable ballast effect of the additive. The compacting aids are normally used in quantities of from about 0.2 to about 30% by weight and preferably in quantities of 0.5 to 10% by weight, based on the total weight of the mixture before compacting. The quantity of compacting aid influences the solubility of the end product and its apparent density to a certain extent. It is of course possible to use mixtures of several compacting aids instead of individual compacting aids in the process according to the invention.

Normally, no other additives are used in the process according to the invention, although it may be useful and even of advantage in some cases to incorporate other substances during the compacting process, for example to improve the appearance, solubility and storability of the products. Examples of such additives are peroxide stabilizers, dyes, dust binding agents, such as paraffin oil, and typical granulation aids. These additives are preferably used in quantities of not more than 5% by weight. In selecting these additives, it is of course important to ensure that they are compatible with the constituents of the granules and do not interfere with the process according to the invention in any way.

In addition to its use as a bleach in detergents, the perborate monohydrate granulated in accordance with the invention may of course also be used for any other applications typical of conventional perborates, for example as oxidizing agents or in cleaning preparations for hard surfaces and in disinfectants.

EXAMPLES

Commercially obtainable sodium perborate monohydrate (Qualität 40, Degussa, containing 15% AO) in quantities of 8 - 99 kg was mixed with the corresponding quantity of compacting aid for 5 minutes in a Lödige mixer (holding capacity 130 l). The mixture was then fed by a screw conveyor to a roller press (Alexanderwerk type VP 50 II/75). The smooth rollers of this compacting unit had a diameter of 12 cm and a width of 7 cm; they were heated with water. The compactates coming from the press were size-reduced in a following sieve cage granulator to a particle size of less than 1.6 mm (sieve mesh width). To round off the edges, the sharp-edged fragments were then treated for 5 minutes in a laboratory ball mill (manufacturer: Hanau, diameter 10 cm). The products were characterized on the basis of their apparent densities and dissolving rates. The dissolving rate was determined by stirring a 5 g sample into 500 ml $H_2O$ at 40° C. under standardized conditions (600 ml glass beaker, blade s rotating at 400 r.p.m.) and is expressed as the time (in minutes) which the solution takes to clarify. In the case of insoluble additives, the time it takes the coarse particles to disappear was determined.

Table 1 shows the conditions of the production process and the properties of the granules obtained. It is clear from the data that the perborate monohydrate can be effectively compacted, even with small quantities of additives, and that high apparent densities are obtained. At the same time, the dissolving rate always remains sufficiently high.

TABLE 1

| Example | Compacting aid | | Linear pressure of the rollers $10^4$ N/cm | Temperature of the rollers °C. | Apparent density g/l | | Dissolving time Minutes |
| --- | --- | --- | --- | --- | --- | --- | --- |
| | Type | Quantity/ % by weight | | | After sieving | After grinding | |
| 1 | $NaBO_3 \times 4H_2O$ | 1 | 1.36 | 30 | 765 | 863 | 1.7 |
| 2 | $NaBO_3 \times 4H_2O$ | 5 | 1.70 | 30 | 712 | 818 | 3.5 |
| 3 | $Na_2SO_4$ | 20 | 1.70 | 30 | 775 | 1012 | 1.5 |
| 4 | Zeolite NaA (Wessalith P, Degussa) | 10 | 1.70 | 30 | 772 | 957 | Approx. 3 |
| 5 | $Na_2CO_3$ | 0.5 | 1.36 | 30 | 755 | 900 | 1.5 |
| 6 | $Na_2CO_3$ | 5 | 1.53 | 30 | 810 | 887 | 1.3 |
| 7 | $Na_2CO_3$ | 10 | 1.53 | 30 | 803 | 851 | 2.0 |

TABLE 1-continued

| Example | Compacting aid Type | Compacting aid Quantity/ % by weight | Linear pressure of the rollers 10⁴ N/cm | Temperature of the rollers °C. | Apparent density g/l After sieving | Apparent density g/l After grinding | Dissolving time Minutes |
|---|---|---|---|---|---|---|---|
| 8 | Na$_2$CO$_3$ × 10H$_2$O | 0.5 | 1.53 | 30 | 756 | 837 | 1.5 |
| 9 | Na$_2$CO$_3$ × 10H$_2$O | 1 | 1.70 | 30 | 790 | 886 | 1.5 |
| 10 | Na$_2$CO$_3$ × 10H$_2$O | 10 | 1.70 | 30 | 845 | 1009 | 1.5 |
| 11 | CH$_3$COONa | 10 | 1.70 | 50 | 757 | 901 | 4.2 |
| 12 | (CH$_3$COO)$_2$Mg | 10 | 1.70 | 30 | 780 | 944 | 3.5 |
| 13 | Na citrate | 5 | 1.53 | 20 | 753 | 819 | 1.3 |
| 14 | Mg citrate | 5 | 1.53 | 20 | 817 | 882 | 1.7 |
| 15 | Mg lactate | 5 | 1.70 | 20 | 770 | 878 | 2.4 |
| 16 | Glucose | 5 | 1.36 | 20 | 776 | 836 | |
| 17 | CMC | 5 | 1.53 | 20 | 756 | 832 | 2.2 |
| 18 | Cornstarch | 5 | 1.36 | 20 | 770 | 817 | 1.7 |
| Comparison | — | — | Uncompacted | 30 | 550 | 560 | 1.5 |

We claim:

1. The process of granulating sodium perborate monohydrate, comprising dry-compacting a mixture of sodium perborate monohydrate and a compacting aid selected from the group consisting of an alkali metal salt, alkaline earth metal salt, carbohydrate, anionic surfactant, and nonionic surfactant, and size-reducing the compactate formed to the desired particle size.

2. The process as in claim 1 wherein said mixture of said sodium perborate monohydrate and said compacting aid is compacted between rollers.

3. The process as in claim 1 including rounding off the particles obtained after size-rounding said compactate.

4. The process as in claim 1 including removing by sieving the undesired particle sizes after size-rounding said compactate.

5. The process as in claim 1 wherein said compacting aid is present in the amount of from about 0.2 to about 30% by weight, based on the weight of said mixture.

6. The process as in claim 1 wherein said alkali metal salt and said alkaline earth metal salt is selected from the group consisting of sodium perborate tetrahydrate, sodium carbonate decahydrate, sodium carbonate, sodium sulfate, sodium citrate, sodium lactate and sodium aluminum silicate.

7. The process as in claim 1 wherein said dry-compacting step is carried out under a linear pressure of from about $1.7 \times 10^3$ N/cm to about $5 \times 10^4$ N/cm.

8. The process as in claim 1 wherein said dry-compacting step is carried out at a temperature of from about 20° C. to about 60° C.

9. The process as in claim 1 wherein said desired particle size is from about 0.3 mm to about 2 mm.

10. The process of preparing granules of sodium perborate monohydrate having an increased density, comprising dry-compacting a mixture of sodium perborate monohydrate and from about 0.2 to about 30% by weight of a compacting aid based on the weight of said mixture, said compacting aid being selected from the group consisting of an alkali metal salt, alkaline earth metal salt, carbohydrate, anionic surfactant, and nonionic surfactant, and size-reducing the compactate formed to the desired particle size.

11. The process as in claim 10 wherein said mixture of said sodium perborate monohydrate and said compacting aid is compacted between rollers.

12. The process as in claim 10 including rounding off the particles obtained after size-reducing said compactate.

13. The process as in claim 10 including removing by sieving the undesired particle sizes after size-reducing said compactate.

14. The process as in clam 10 wherein said alkali metal salt and said alkaline earth metal salt is selected from the group consisting of sodium perborate tetrahydrate, sodium carbonate decahydrate, sodium carbonate, sodium sulfate, sodium citrate, sodium lactate and sodium aluminum silicate.

15. The process as in claim 10 wherein said dry-compacting step is carried out under a linear pressure of from about $1.7 \times 10^3$ N/cm to about $5 \times 10^4$ N/cm.

16. The process as in claim 10 wherein said dry-compacting step is carried out at a temperature of from about 20° C. to about 60° C.

17. The process as in claim 10 wherein said desired particle size is from about 0.3 mm to about 2 mm.

* * * * *